Aug. 9, 1927.

E. ROUČKA

MEASURING SYSTEM

Filed July 17, 1922

1,638,100

INVENTOR:
Erich Roučka,
BY
Everett Rook,
ATTORNEYS.

Patented Aug. 9, 1927.

1,638,100

UNITED STATES PATENT OFFICE.

ERICH ROUČKA, OF BLANSKO, CZECHOSLOVAKIA.

MEASURING SYSTEM.

Application filed July 17, 1922, Serial No. 575,746, and in Austria February 16, 1918.

This invention relates to a system for transmitting variations or fluctuations in a physical or chemical quantity, quality or condition, such, for example, as pressure, force, position of a movable member, speed, intensity of flow, effect, momentum, temperature, heat contained in gases or fluids, efficiency, electrical and magnetic quantities, intensity of combustion, oxidation, reduction, composition of fluids, etc., to an auxiliary fluid condition, for instance, pressure, pressure difference, flow of fluid, vibrations of fluid, etc., whereby said fluid condition is a function of said quantity or quality and a measure thereof.

The system of the present invention in general is similar to the system disclosed in my co-pending application Serial No. 575,756.

My invention consists in general of the provision of a system of the character described comprising means sensitive to variations in said quantity, quality or condition and to variations in said variable fluid condition so that said quantity, quality or condition and said fluid condition have a balanced relation, means responsive to departures from the balance in said sensitive means, means for varying the fluid condition to restore balance, and means actuated by auxiliary power to cooperate with said means responsive to departure from the balance for actuating said means for varying said fluid condition.

Another object of the invention is to provide in such a system a resilient, expansible or extensible hollow tube sensitive to or adapted to be influenced by the fluid condition to cooperate with means sensitive to variations in the quantity or quality.

Further objects of the invention are to provide in a system of the character described, a yieldable connection of the means sensitive to variations in the quantity or quality and the means sensitive to variations in the fluid condition, for balancing the power or energy of the quantity or quality and the comparatively greater power or energy of the fluid condition, said yieldable connection absorbing a portion of the power of the fluid condition; and to obtain other results and advantages as may be brought out by the following description.

Referring to the accompanying drawings, in which like numerals of reference indicate the same parts throughout the several views, Figure 1 is a diagrammatic illustration of a system embodying my invention;

Figure 1:
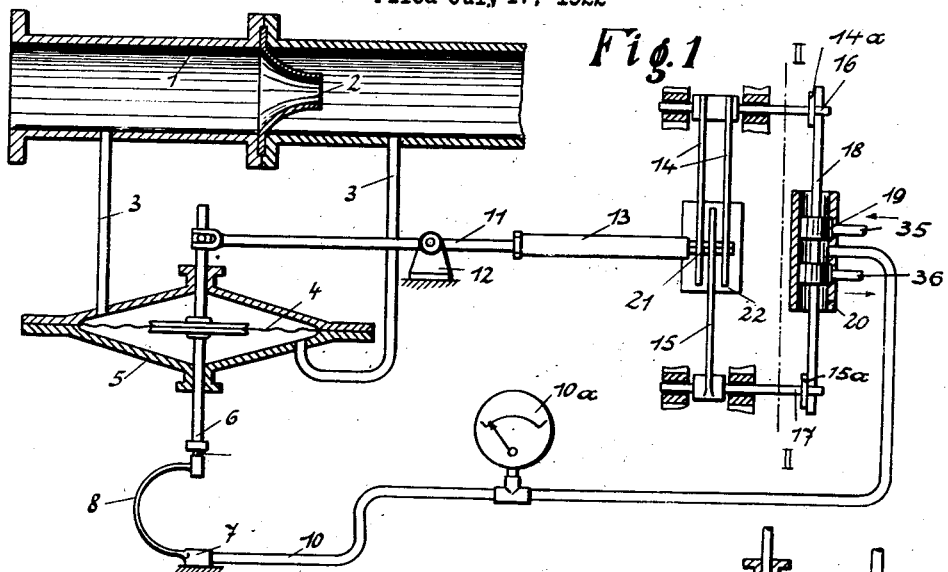

For the purposes of illustration, I have shown a system in which the physical or chemical quantity or condition is in the form of a fluid under pressure which may be conducted through a conduit 1 having a flow resistance device 2 therein. Pipes 3 have one end thereof connected to the conduit 1 on opposite sides of the flow resistance device 2 and their opposite ends connected to a diaphragm chamber 5 on opposite sides of a diaphragm 4, so that the diaphragm 4 is sensitive to or influenced by differences in pressure in the conduit 1 at opposite sides of the device 2. The diaphragm 4 is provided with a rod 6 one end of which engages through a conical bearing 9 one end of a hollow resilient tube, in the present instance a Bourdon tube, which is adapted to be influenced by the fluid condition.

The fluid condition is shown as fluid under pressure flowing from a supply pipe 35 through a governor valve comprising the cylinder 20 and piston 19 and from the governor valve through a pipe 10 to the end 7 of the Bourdon tube opposite the end connected to the diaphragm rod 6. When the system is balanced, or in other words, when the diaphragm 4 is balanced by the fluid pressure at opposite sides of the flow resistance device 2 and the pressure of the fluid condition in the tube 8, the piston 19 of the governor valve is in its neutral position to prevent fluid from entering the pipe 10 from the supply pipe 35 or leaving the pipe 10 through the exhaust pipe 36.

Figure 2:
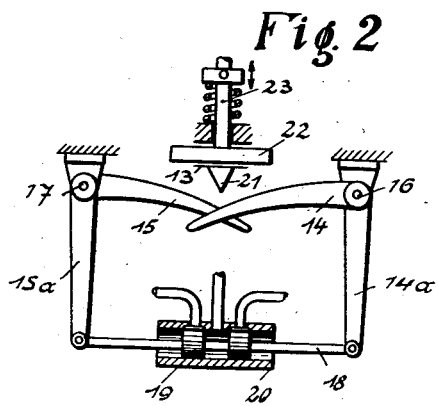
Figure 2 is a diagrammatic sectional view taken on the line II—II of Fig. 1.

The end of the diaphragm rod 6 opposite that connected to the Bourdon tube 8 has a pin and slot connection with one end of a lever 11 pivotally connected intermediate its ends to a fixed support as at 12, whereby movement of said diaphragm 4 or upon departures from balance in the system, the lever 11 is oscillated. The end of the lever 11 opposite the rod 6 carries a flexible strip 13 having at its free end a wedge-shaped member 21 adapted to cooperate with sets of levers 14 and 15 to actuate the governor valve. The levers 14 and 15 at one end thereof are mounted on the respective shafts 16 and 17 rotatable in suitable fixed supports, and the free ends of the levers are arranged in overlapping relation as clearly shown in Figure 2. The shafts 16 and 17 are connected by the respective arms 14ª and 15ª to opposite ends of the piston rod 18 of the piston 19 of the governor valve. The member 21 is actuated into engagement with the levers 14 and 15 by suitable means periodically actuated by auxiliary power. In the present instance such means is shown as comprising a block 22 mounted on a rod 23 slidable in a suitable fixed support and adapted to be connected to a suitable source of power for reciprocation as indicated by the arrows in Figure 2.

In the operation of the system, when the same is in balanced condition the member 21 is positioned equidistantly from the free ends of the levers 14 and 15, and when actuated by the member 22 engages both the levers 14 and 15 simultaneously and equidistantly from the free end thereof so that the levers and arms 14ª and 15ª pull on opposite ends of the piston rod 18 with equal force. Thus, the levers and piston 19 remain stationary in neutral position. When the diaphragm 4 is influenced in one direction or the other by variations in the fluid pressure in the conduit 1, the lever 11 is oscillated to move the member 21 in one direction as a function of the variation in the flow of fluid in conduit 1 so that when actuated by the member 22 it engages one of the levers 14 or 15 in advance of the other so as to move the piston 19 in one direction. Thus, fluid is either admitted to the pipe 10 from the supply pipe 35 or allowed to escape from the supply pipe 10 through the exhaust pipe 36, so that the pressure in the pipe 10 is varied. The fluid in the said pipe influences the tube 8 so as to tend to straighten the same or allow the same to bend upon itself, whereby the fluid condition compensates the movement of the diaphragm 4 and restores balance in the system. The fluid condition, in other words, the pressure in the pipe 10, is a function of the physical or chemical quantity or quality, and a manometer 10ª is preferably connected in the pipe 10 to measure said condition.

Figure 3:
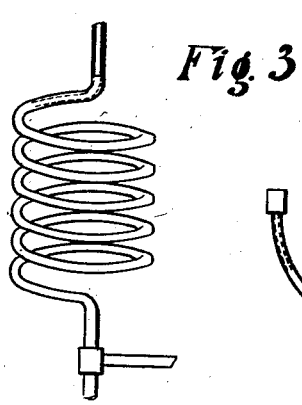
Figure 3 is a perspective view of a modified form of resilient tube adapted to be utilized as the means sensitive to the fluid condition.

If desired a helically coiled tube such as shown in Figure 3 may be utilized instead of the tube 8, and in operation the fluid condition tends to extend the tube longitudinally of the coil or allow the same to collapse. The motion of the tube is transmitted to the diaphragm in a manner similar to that above described.

Figure 4:
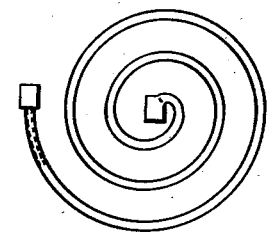
Figure 4 is a plan view of another form of resilient tube.

Figure 4 shows a spirally coiled tube which may also be used instead of the tube 8, in operation one end of said tube being connected to the pipe 10 and the other end engaging the diaphragm rod 6 or its equivalent.

Figure 5:
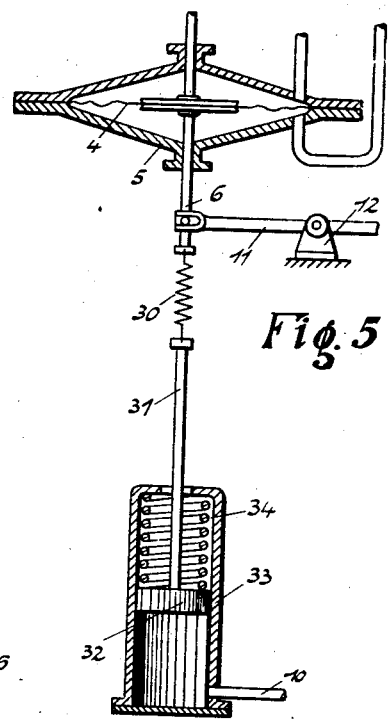
Figure 5 is a fragmentary diagrammatic illustration of the means sensitive to the physical or chemical quantity and quality and a modified form of means sensitive to the fluid condition.

In Figure 5 of the drawings the fluid condition in the pipe 10 is shown as acting upon a piston 32 mounted in a cylinder 33 and having a piston rod 31 which is connected at its end by a yielding member 30, such as a spring, to the diaphragm rod 6. In this construction an increase in pressure in the fluid in the pipe 10 moves the piston 32 against the action of a spring 34 and upon a decrease in pressure of the said fluid the spring 34 actuates the piston against the said pressure. The motion of the piston is transmitted to the diaphragm 4 so as to cooperate with the said diaphragm to restore balance in the system, in a manner similar to that described in connection with Figure 1 of the drawings. The spring 30 balances the pressure or power actuating the diaphragm 4 and the comparatively large pressure or power actuating the piston 32, the said spring absorbing a portion of the power actuating the piston. The diaphragm rod 6 may be connected to means responsive to departures from balance in the system, such as the lever 11, and the pipe 10 may be connected to a governor valve, such as 19, 20 so that the system operates substantially as that shown in Figure 1.

While I have shown the system embodying mechanisms of certain detail constructions it will be understood that this is only for illustrating the principles of the invention, and that many modifications and changes in the detail mechanism may be made without departing from the spirit or scope of the invention. Therefore, I do not wish to be understood as restricting myself except as required by the following claims when construed in the light of the prior art.

Having thus described the invention, what I claim is:

1. A system for measuring a variable condition by varying an auxiliary fluid condition, comprising means movably sensitive to variations in the variable condition to be measured, means movably sensitive to an auxiliary fluid condition, said two means being connected so as to have a balanced relation, means responsive to departures from said balanced relation of said devices as a function of the variation in said condition to be measured, means for varying said auxiliary fluid condition, means adapted to be actuated by auxiliary power to periodically cooperate with said means responsive to departures from balance for actuating said last-mentioned means to vary said auxiliary fluid condition as a function of said condition to be measured and restore said balance, and means for measuring said auxiliary fluid condition.

2. A system for measuring a variable condition by varying an auxiliary fluid condition, comprising means movably sensitive to variations in the variable condition to be measured, means movably sensitive to an auxiliary fluid condition, means connecting the first two-mentioned means to permit relative movement of said two means and so that said two means have a balanced relation, means for varying said auxiliary fluid condition, means responsive to departures from said balanced relation of said first two-mentioned means to control said means for varying said auxiliary fluid condition so that said auxiliary fluid condition is varied as a function of the condition being measured, and means for measuring said auxiliary fluid condition.

3. A system for measuring a variable condition by varying an auxiliary fluid condition, comprising means movably sensitive to variations in the variable condition to be measured, means movably sensitive to an auxiliary fluid condition connected to the first-mentioned means to permit relative movement of said two means and so that said two means have a balanced relation, means for varying said auxiliary fluid condition, means responsive to departures from said balanced relation as a function of the variation in said condition to be measured, and means adapted to be actuated by auxiliary power to periodically cooperate with said means responsive to departures from balance to actuate said means for varying the auxiliary fluid condition so that said auxiliary fluid condition is varied as a function of said condition to be measured.

4. A system for measuring a variable condition by varying an auxiliary fluid condition, comprising means movably sensitive to variations in the variable condition to be measured, a resilient hollow tube sensitive to variations in an auxiliary fluid condition, means for supplying auxiliary fluid to said tube, said means and said tube being connected to have a balanced relation, means responsive to departures from said balanced relation of said means and said tube as a function of the variation in said condition to be measured, and means controlled by said means responsive to departures from balance for varying said auxiliary fluid condition as a function of said condition to be measured.

5. A system for measuring a variable condition by varying an auxiliary fluid condition, comprising means movably sensitive to variations in the variable condition to be measured, a resilient hollow tube sensitive to variations in an auxiliary fluid condition, means for supplying auxiliary fluid to said tube, said means and said tube being connected to have a balanced relation, means responsive to departures from said balanced relation of said means and said tube as a function of the variation of said condition to be measured, means for varying said auxiliary fluid condition, and means adapted to be actuated by auxiliary power to periodically cooperate with said means responsive to departures from balance for actuating said means for varying said auxiliary fluid condition to vary said auxiliary fluid condition as a function of said condition being measured.

6. A system for measuring a variable condition by varying an auxiliary fluid condition, comprising means movably sensitive to variations in the variable condition to be measured, a resilient hollow tube sensitive to variations in an auxiliary fluid condition and connected to said sensitive means so that said sensitive means and said tube may move relatively to each other and have a balanced relation; means for supplying auxiliary fluid to said tube, means responsive to departures from said balanced relation of said means and said tube as a function of the variation in said condition to be measured, and means controlled by said means responsive to departures from balance for varying said auxiliary fluid condition as a function of said condition to be measured.

7. A system for measuring a variable condition by varying an auxiliary fluid condition, comprising means movably sensitive to variations in the variable condition to be measured, a resilient hollow tube sensitive to variations in an auxiliary fluid condition and connected to said sensitive means so that said sensitive means and said tube may move relatively to each other and have a balanced relation, means for supplying auxiliary fluid to said tube, means responsive to departures from said balanced relation of said means and said tube as a function of the variation in said condition to be measured, means for varying said auxiliary fluid condition, and means adapted to be actuated by auxiliary power to periodically cooperate with said means responsive to departures from balance for actuating said means for varying said auxiliary fluid condition to vary said auxiliary fluid condition as a function of said condition being measured.

8. A system for measuring a variable condition by varying an auxiliary fluid condition, comprising means movably sensitive to variations in the variable condition to be measured, means movably sensitive to variations in an auxiliary fluid condition to balance the first-mentioned means, means for varying said auxiliary fluid condition, means for actuating said varying means including two spaced mechanisms one of which is connected to said varying means and the other periodically actuated by auxiliary power toward and from said first-mentioned mechanism, a member freely movable between said spaced mechanisms, means actuated by cooperation of said two sensitive means for operating said member upon and as a function of a departure from the balanced relation of said two sensitive means due to variations in the condition being measured, said movable member being adapted to be periodically actuated into engagement with the first-mentioned mechanism to actuate said varying means in accordance with the position of said member relative to said mechanism, and means for measuring said auxiliary fluid condition.

9. A system for measuring a variable condition by varying an auxiliary fluid condition, comprising means movably sensitive to variations in the variable condition to be measured, means movably sensitive to auxiliary fluid pressure, said two means being connected so as to have a balanced relation, means for supplying fluid under pressure, a governor valve to control flow of fluid from said supply means to said fluid pressure sensitive means, means for actuating said valve including two spaced mechanisms one of which is connected to said valve and the other periodically actuated by auxiliary power toward and from the first-mentioned mechanism, a member freely movable between said spaced mechanisms, means actuated by cooperation of said two sensitive means for operating said member upon and as a function of a departure from said balanced relation due to variations in the condition being measured, said member being adapted to be periodically actuated by said periodically actuated mechanism into engagement with the other of said mechanisms to actuate said valve in accordance with the position of said movable member relative to said last-mentioned mechanism, whereby said fluid pressure is varied as a function of the variation in the condition being measured, and means for measuring said fluid pressure.

ERICH ROUČKA.